United States Patent
Yeung

(10) Patent No.: US 9,144,347 B2
(45) Date of Patent: Sep. 29, 2015

(54) FOOD BAKING MACHINE

(75) Inventor: Wing Yiu Yeung, Hong Kong (HK)

(73) Assignee: ADVANCED MATERIALS ENTERPRISES COMPANY LIMITED, Hong Kong (HK)

( * ) Notice: Subject to any disclaimer, the term of this patent is extended or adjusted under 35 U.S.C. 154(b) by 1076 days.

(21) Appl. No.: 12/817,168

(22) Filed: Jun. 16, 2010

(65) Prior Publication Data

US 2011/0011276 A1 Jan. 20, 2011

(30) Foreign Application Priority Data

Jul. 16, 2009 (HK) .................................... 09106478

(51) Int. Cl.
*A47J 37/06* (2006.01)
*H05B 3/68* (2006.01)

(52) U.S. Cl.
CPC .................................. *A47J 37/0611* (2013.01)

(58) Field of Classification Search
CPC .................................................. A47J 37/0611
USPC ........... 99/372, 318, 319, 324, 326, 327, 371, 99/377, 378, 380, 385, 389–399, 424, 99/427; 219/443, 492, 494, 443.1
See application file for complete search history.

(56) References Cited

U.S. PATENT DOCUMENTS

| | | | | |
|---|---|---|---|---|
| 2,681,404 A * | 6/1954 | Hans Hofer | | 219/525 |
| 4,088,067 A * | 5/1978 | Kaebitzsch et al. | | 99/379 |
| 4,178,500 A * | 12/1979 | Brindopke | | 219/524 |
| 5,382,441 A * | 1/1995 | Lentz et al. | | 426/241 |
| 5,755,150 A * | 5/1998 | Matsumoto et al. | | 99/334 |
| 5,934,182 A * | 8/1999 | Harter et al. | | 99/349 |
| 6,044,755 A * | 4/2000 | Misceo | | 99/332 |
| 6,060,175 A * | 5/2000 | Swisher | | 428/612 |
| 6,497,738 B2 * | 12/2002 | Lin | | 55/385.1 |
| 2008/0190409 A1 * | 8/2008 | Demol et al. | | 126/211 |
| 2008/0264931 A1 * | 10/2008 | Vilato et al. | | 219/622 |
| 2009/0038482 A1 * | 2/2009 | Ellersiek et al. | | 99/449 |

FOREIGN PATENT DOCUMENTS

WO    WO 2008047034 A2 *  4/2008

* cited by examiner

*Primary Examiner* — Dana Ross
*Assistant Examiner* — Ket D Dang

(57) ABSTRACT

A food baking machine includes a heating device. The heating device includes a lower hot plate on a lower side of the heating device, a rotatable and vertically slidable upper hot plate on an upper side of the heating device, a rotatable connecting member for connecting the lower hot plate and the upper hot plate and a sliding member. The upper hot plate is slidably connected to the connecting member and fixes its position thereunto by the sliding member. The upper hot plate is rotatable connected with the sliding member. The upper hot plate and the lower hot plate are connected to power supply separately. The connecting member includes a first connecting segment, a second connecting segment and an axle. The second connecting segment is rotatable connected to the first connecting segment by the axle.

9 Claims, 5 Drawing Sheets

FOOD BAKING MACHINE

CROSS-REFERENCE TO RELATED APPLICATIONS

This patent application claims priority of HK short term application No. 09106478.9 filed on 16 Jul. 2009, the entire contents of which is hereby incorporated by reference.

FIELD OF PATENT APPLICATION

The present application relates to a type of food baking machine, and more specifically to a type of food baking machine with hot plates in direct or indirect contact with the food being baked.

BACKGROUND

The existing bread machines, usually called toasters, consist mainly of housing, baking chamber, bread holder, pull-in and lifting/lowering device, power supply and relevant electric circuit. The baking chamber consists of reflector plate, hot plate, separating grid, bread holder, end plate and bottom plate. The reflector plate, hot plate and separating grid are fixed between two end plates and arranged sequentially at both sides of bread holder, which can vertically move upwards and downwards. During operation, bread slices are inserted into the baking chamber, onto the bread holder, which cuts in the power under the action of external force, resulting in a traction by the pull-in device and starting of baking process. The existing hot plates include a number of heating wires. As the slices of bread might be different in thickness, and that hot plates and separating grids are fixed in position, uneven space may exist between slices and hot plates. If a slice is not placed centered and in contact with hot plate, the slice would emit burning smell as it touches the heating wires during baking, thus affecting the taste of sliced bread. And when taking the bread directly from the baking chamber with hand, a contact with the hot plates at both sides of the bread may happen, which causes electric shock accident. On the other hand, due to limited space of baking chamber, other types of food such as sandwich cannot be baked. It restricts the use of the baking machines.

SUMMARY

In one aspect, a food baking machine includes a heating device, and the heating device includes a lower hot plate on a lower side of the heating device, an upper hot plate on an upper side of the heating device, a connecting member for connecting the lower hot plate and the upper hot plate, and a sliding member. The upper hot plate is slidably connected to the connecting member and fixes its position thereunto by the sliding member. The upper hot plate is rotatable connected with the sliding member. The upper hot plate and the lower hot plate are connected to power supply separately. The connecting member includes a first connecting segment, a second connecting segment and an axle. The second connecting segment is rotatable connected to the first connecting segment via the axle.

The upper hot plate and the lower hot plate may be flat plate.

The upper hot plate and the lower hot plate may be made of heat-resistant materials.

The heat-resistant material may be glass ceramic.

The food baking machine may further include an electric control device, which is used to drive the slide of the sliding member and the rotation of the upper hot plate.

The food baking machine may further include a timer controller and a temperature monitoring and controlling system, the timer controller and the temperature monitoring and controlling system is electrically connected with the upper hot plate and the lower hot plate to set and control the heating time and temperature.

The food baking machine may further include a timer controller or a temperature monitoring and controlling system, the timer controller and the temperature monitoring and controlling system is electrically connected with the upper hot plate and the lower hot plate to set and control the heating time and temperature.

DETAILED DESCRIPTION

Figure 1:
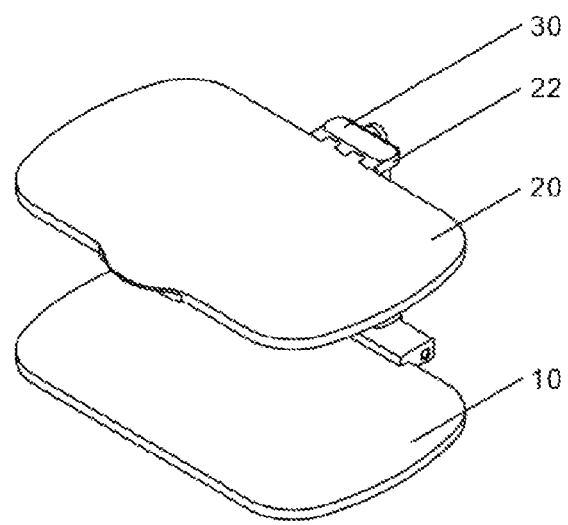
FIG. 1 is the $1^{st}$ perspective view of the food baking machine.

Reference will now be made in detail to a preferred embodiment of the food baking machine disclosed in the present application, examples of which are also provided in the following description. Exemplary embodiments of the food baking machine disclosed in the present application are described in detail, although it will be apparent to those skilled in the relevant art that some features that are not particularly important to an understanding of the food baking machine may not be shown for the sake of clarity.

Furthermore, it should be understood that the food baking machine disclosed in the present application is not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of this disclosure and appended claims.

It should be noted that throughout the specification and claims herein, when one element is said to be "connected" to another, this does not necessarily mean that one element is fastened, secured, or otherwise attached to another element. Instead, the term "connected" means that one element is either connected directly or indirectly to another element, or is in mechanical or electrical communication with another element.

Referring to FIGS. 1 to 10, the food baking machine in this patent application includes housing, heating device, power source and other elements. The food baking machine can be used for baking bread, and also for making sandwich and heating food. The principal improvement of this patent application resides in the heating device, which includes the lower hot plate 10 on the lower side, the rotatable and vertically slidable upper hot plate 20 on the upper side and a rotatable connecting member 30 to connect the lower hot plate 10 and the upper hot plate 20. The upper and lower surfaces of hot plates provide a large and highly efficient heating zone for direct or indirect contact with the food being heated, and the space between the upper and lower hot plates can be easily adjusted to fit different types of food.

In one embodiment, the lower hot plate 10 is a flat plate of generally rectangular shape. This lower hot plate 10 can also be a flat plate of round, oval or other shapes according to actual needs. This lower hot plate 10 is made of glass ceramic or other heat-resistant materials. The food baking machine in this patent application adopts the hot plates made of glass ceramic for higher durability and abrasion resistance, as well as easier cleaning and maintenance. The edge of one side of the lower hot plate 10 is connected with the connecting member 30. This lower hot plate 10 is connected to the power supply via electrical wiring.

In one embodiment, the upper hot plate 20 is a flat plate in a generally rectangular shape. This upper hot plate 20 can also be a flat plate of round, oval or other shapes according to actual needs.

This upper hot plate 20 is made of glass ceramic or other heat-resistant materials. The edge of one side of the upper hot plate 20 is connected with a sliding member 22 via an axle. The sliding member 22 can be slidably connected to the connecting member 30. This upper hot plate 20 is connected to the power supply via electrical wiring.

The food baking machine in this patent application can be supplied by 220V or 110V AC power or 18V to 24V DC power. Therefore, it is suitable for outdoor activities. And by using of DC power units, automobile batteries or solar cells, the food baking machine in this patent application can be used in remote areas. The food baking machine in this patent application is of very low power consumption, being merely 200 W.

The upper and lower hot plates of food baking machine in this patent application adopt single or multiple layers of nano-thickness of heating coating or other heating materials and elements for heat generation. These upper and lower hot plates use electric power or other types of energy to produce more efficient heat power.

The connecting member 30 includes a first connecting segment 31 and a strip-shaped second connecting segment 32. The second connecting segment 32 is rotatable connected with the first connecting segment 31 about the rotation axis 33. The height of the first connecting segment 31 is generally equal to the total thickness of the upper hot plate 20 and the lower hot plate 10. The sliding member 22 can slide on the first connecting segment 31 and the second connecting segment 32, and fix its position at any point of sliding. The space between the upper hot plate 20 and the lower hot plate 10 can be adjusted to suit different heights of the food to be baked.

The upper and lower hot plates of food baking machine in this patent application can change their positions along the first and second connecting segments either mechanically or electrically, so as to change the space between the upper and lower hot plates for different requirements on space, and thus baking different types of food. The upper hot plate can also be rotated along an inclination angle either mechanically or electrically for easy placing or taking-out of baked food.

Figure 2:
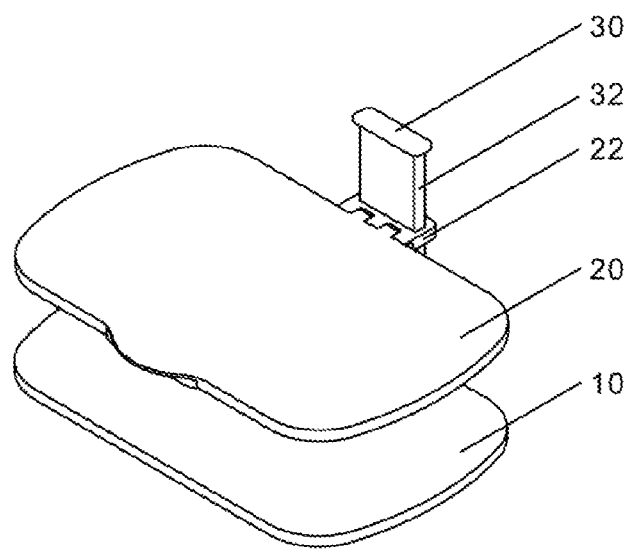
FIG. 2 is the $2^{nd}$ perspective view of the food baking machine, with the upper hot plate transferred downwards.
Figure 3:
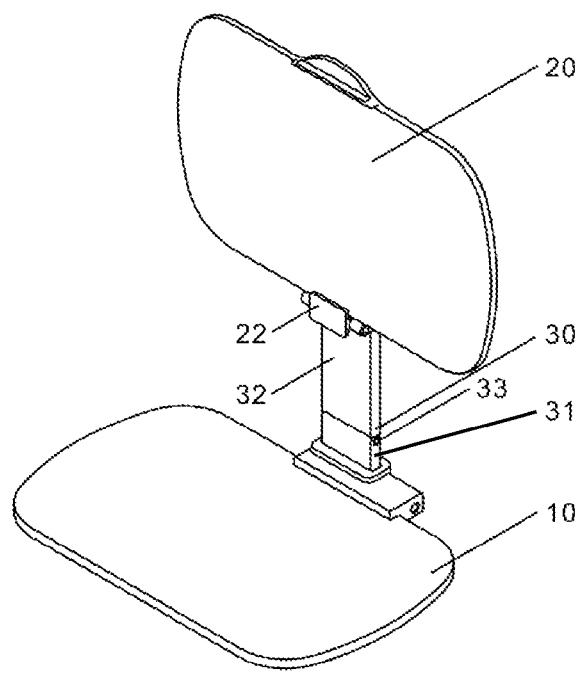
FIG. 3 is the $3^{rd}$ perspective view of the food baking machine, with the upper hot plate rotated upwards.

In operation, the power is turned on to heat the upper hot plate 20 and the lower hot plate 10. The bread (or other food) is placed in-between the upper hot plate 20 and the lower hot plate 10. The bread will be evenly heated on the upper side as on the lower side. As shown in FIGS. 1 and 2, the position of the upper hot plate 20 can be adjusted vertically according to the size of food, by mechanically or electrically moving the sliding member 22. The upper hot plate 20 can be rotated upwards or downwards either mechanically or electrically according to the position of food to be heated. Besides, it is capable to turn on only the upper hot plate 20 or the lower hot plate 10 for food baking by electrical setting. In this embodiment, the food baking machine is provided with timer controller and/or temperature monitoring and controlling system, which is electrically connected with the upper and/or lower hot plates to set and control the heating time and temperature. Therefore it is easy to satisfactorily bake bread or other food as desired. The upper and lower hot plates of food baking machine in this patent application can be turned on for heating simultaneously or independently.

Figure 4:
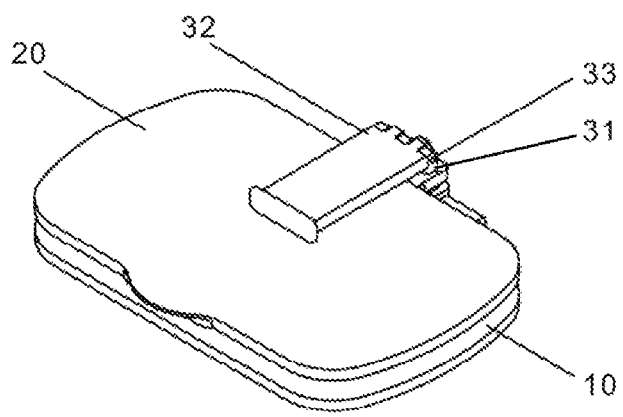
FIG. 4 is the $4^{th}$ perspective view of the food baking machine, with upper and lower hot plates closed up and the second connecting member folded down.
Figure 5:
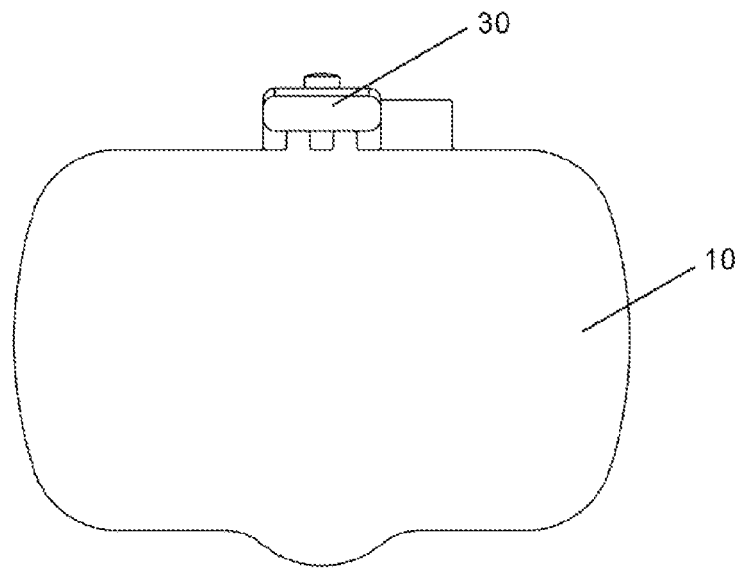
FIG. 5 is the top view of the food baking machine.
Figure 6:
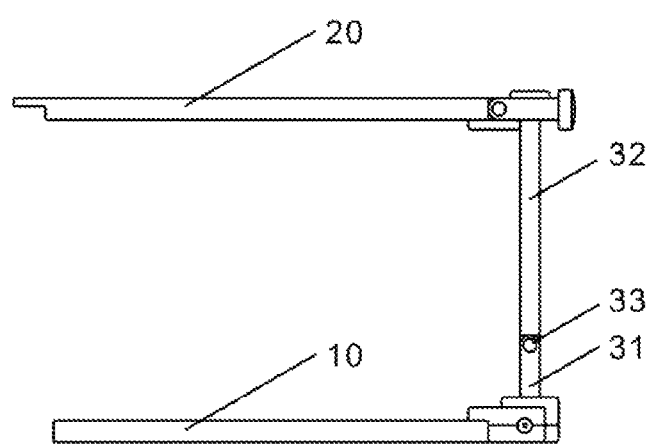
FIG. 6 is the right view of the food baking machine.
Figure 7:
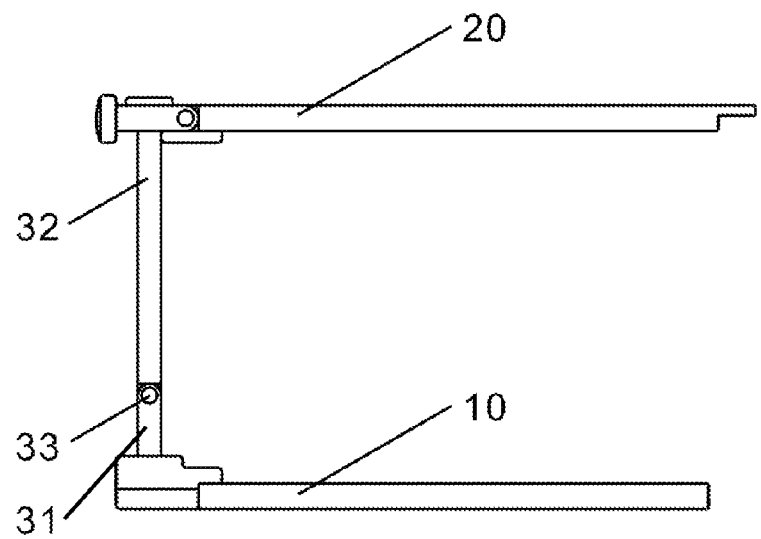
FIG. 7 is the left view of the food baking machine.
Figure 8:
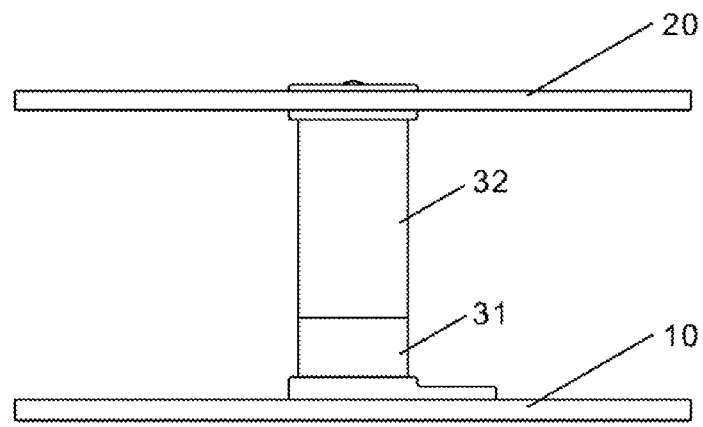
FIG. 8 is the front view of the food baking machine.
Figure 9:
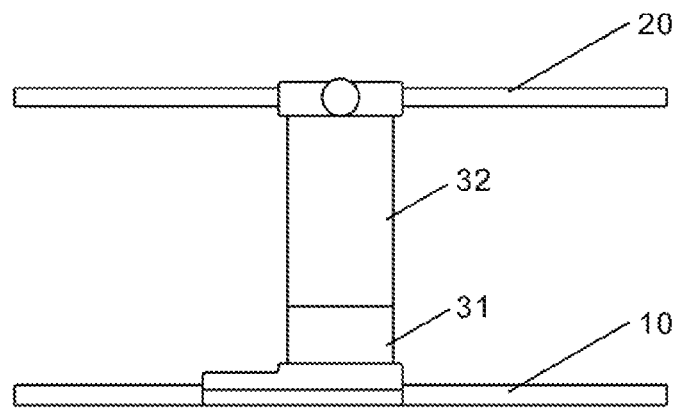
FIG. 9 is the rear view of the food baking machine.
Figure 10:
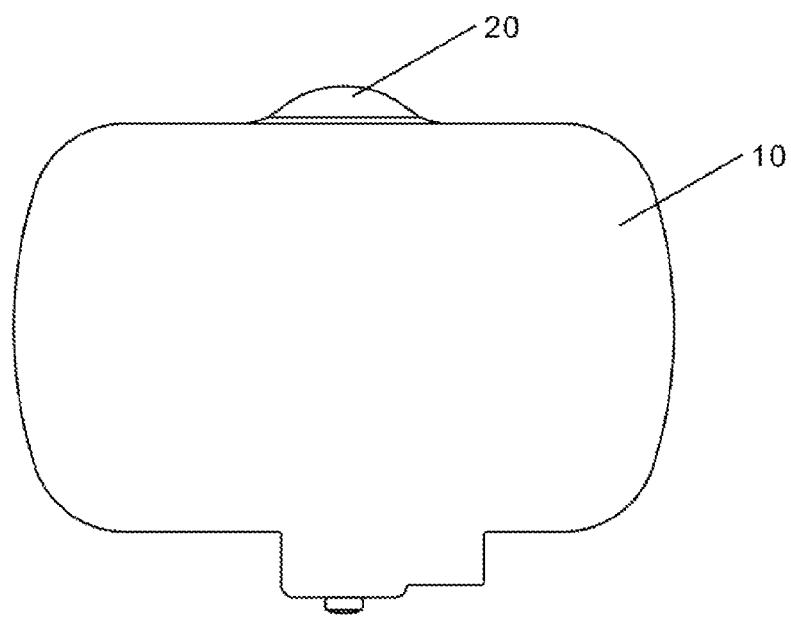
FIG. 10 is the bottom view of the food baking machine.

As shown in FIG. 4, when the baking machine is not in use, the sliding member 22 is slide downwards to make the upper hot plate 20 to reach the position of the first connecting segment 31 and join with the lower hot plate 10. The second connecting segment 32 is then rotated downwards to make it slightly press the upper hot plate 20. This way, the upper hot plate 20 and the lower hot plate 10 become closed, reducing the space they take.

The food baking machine in this patent application can be folded when not used. The folded food baking machine will be impact in structure, with thickness not exceeding about 50 mm.

What is claimed is:

1. A food baking machine comprising a heating device, the heating device comprising:
    a lower hot plate on a lower side of the heating device,
    an upper hot plate on an upper side of the heating device,
    a foldable upright connecting member of uniform cross section for connecting the lower hot plate and the upper hot plate, and
    a sliding member having an opening for slidably receiving therein the foldable upright connecting member and adapted to be slidable vertically therealong, the dimension of the opening being substantially equal to dimension of the uniform cross section of the foldable upright connecting member;
    the upper hot plate being slidably connected to the connecting member and having its position fixed thereunto by the sliding member;
    the upper hot plate being rotatably connected with the sliding member and rotatable upwards to a vertical position perpendicular to the lower hot plate or downwards to a horizontal position above and parallel to the lower hot plate;
    the connecting member comprising a lower upright connecting segment, an upper upright connecting segment and a rotating axle; and the upper upright connecting segment being rotatably connected to the lower upright connecting segment via the rotating axle, the upper upright connecting segment being rotatable between a vertical position where the upper upright connecting segment is in vertical alignment with the lower upright connecting segment and a horizontal position where the upper upright connecting segment is disposed above and parallel to the lower hot plate;
    wherein the upper hot plate is parallelly moveable with respect to the lower hot plate when the sliding member slides on the lower upright connecting segment and the upper upright connecting segment;

wherein the upper and lower hot plates are flat plates made of glass ceramic, and adopt single or multiple layers of nano-thickness of heating coating; and wherein the height of the lower upright connecting segment is equal to total thickness of the upper and lower hot plates, and the sliding member is adapted to slide downwards to the lower upright connecting segment such that the upper hot plate is rested on top of the lower hot plate, and then the upper upright connecting segment is adapted to rotate downwards to its horizontal position such that the upper upright connection segment is rested on top of the upper hot plate.

2. The food baking machine as claimed in claim 1, further comprising an electric control device adapted to drive the slide of the sliding member and the rotation of the upper hot plate, a timer controller electrically connected with the upper and lower hot plates for setting and controlling heating time, and a temperature monitoring and controlling system electrically connected with the upper and lower hot plates for setting and controlling heating temperature.

3. The food baking machine as claimed in claim 1, wherein the food baking machine is configured to be folded into a compact structure with a thickness not exceeding about 50 mm.

4. A food baking machine comprising a heating device, the heating device comprising:
a lower hot plate on a lower side of the heating device,
an upper hot plate on a upper side of the heating device,
a foldable upright connecting member of uniform cross section for connecting the lower hot plate and the upper hot plate and a sliding member having an opening for slidably receiving therein the foldable upright connecting member and adapted to be slidable vertically therealong, the dimension of the opening being substantially equal to dimension of the uniform cross section of the foldable upright connecting member,
the upper hot plate being slidably connected to the connecting member and having its position fixed thereunto by the sliding member,
the upper hot plate being rotatably connected with the sliding member and rotatable upwards to a vertical position perpendicular to the lower hot plate or downwards to a horizontal position above and parallel to the lower hot plate,
the connecting member comprising a lower upright connecting segment, an upper upright connecting segment and a rotating axle; and the upper upright connecting segment being rotatably connected to the lower upright connecting segment via the rotating axle, the upper upright connecting segment being rotatable between a vertical position where the upper upright connecting segment is in vertical alignment with the lower upright connecting segment and a horizontal position where the upper upright connecting segment is disposed above and parallel to the lower hot plate;

wherein the upper hot plate and the lower hot plate are flat plate; and the upper hot plate and the lower hot plate are made of heat-resistant material; and the food baking machine further comprising an electric control device, which is used to drive the slide of the sliding member and the rotation of the upper hot plate;

wherein the upper hot plate is parallelly moveable with respect to the lower hot plate when the sliding member slides on the lower upright connecting segment and the upper upright connecting segment;

wherein the upper and lower hot plates adopt single or multiple layers of nano-thickness of heating coating.

5. The food baking machine as claimed in claim 4, further comprising a timer controller and a temperature monitoring and controlling system, the timer controller and the temperature monitoring and controlling system is electrically connected with the upper hot plate and the lower hot plate to set and control the heating time and temperature.

6. The food baking machine as claimed in claim 4, further comprising a timer controller or a temperature monitoring and controlling system, the timer controller and the temperature monitoring and controlling system is electrically connected with the upper hot plate and the lower hot plate to set and control the heating time and temperature.

7. The food baking machine as claimed in claim 4, wherein the heat-resistant material is glass ceramic.

8. The food baking machine as claimed in claim 4, wherein the height of the lower upright connecting segment is equal to total thickness of the upper and lower hot plates, and the sliding member is adapted to slide downwards to the lower upright connecting segment such that the upper hot plate is rested on top of the lower hot plate, and then the upper upright connecting segment is adapted to rotate downwards to its horizontal position such that the upper upright connection segment is rested on top of the upper hot plate.

9. The food baking machine as claimed in claim 8, wherein the food baking machine is configured to be folded into a compact structure with a thickness not exceeding about 50 mm.

\* \* \* \* \*